US009614767B2

(12) United States Patent
Horihata et al.

(10) Patent No.: US 9,614,767 B2
(45) Date of Patent: Apr. 4, 2017

(54) TRANSMISSION MESSAGE GENERATING DEVICE AND VEHICLE-MOUNTED COMMUNICATION SYSTEM

(75) Inventors: Satoshi Horihata, Yokkaichi (JP); Hideki Yamamoto, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 128 days.

(21) Appl. No.: 14/361,646

(22) PCT Filed: Dec. 2, 2011

(86) PCT No.: PCT/JP2011/077989
§ 371 (c)(1),
(2), (4) Date: May 29, 2014

(87) PCT Pub. No.: WO2013/080387
PCT Pub. Date: Jun. 6, 2013

(65) Prior Publication Data
US 2014/0334300 A1     Nov. 13, 2014

(51) Int. Cl.
*H04L 12/801* (2013.01)
*H04L 12/40* (2006.01)
*H04L 12/12* (2006.01)

(52) U.S. Cl.
CPC .............. *H04L 47/12* (2013.01); *H04L 12/12* (2013.01); *H04L 12/40039* (2013.01); *H04L 2012/40273* (2013.01); *Y02B 60/34* (2013.01)

(58) Field of Classification Search
None
See application file for complete search history.

(56) References Cited

U.S. PATENT DOCUMENTS

2004/0212505 A1* 10/2004 Dewing ............... A61B 5/0002
340/573.1
2006/0062164 A1* 3/2006 Jung ..................... H04L 1/1887
370/278

(Continued)

FOREIGN PATENT DOCUMENTS

CN       101840533      9/2010
JP     A-2001-257694    9/2001

(Continued)

OTHER PUBLICATIONS

Jan. 10, 2012 International Search Report issued in International Application No. PCT/JP2011/077989.

*Primary Examiner* — Jeffrey M Rutkowski
*Assistant Examiner* — Mehedi Aley
(74) *Attorney, Agent, or Firm* — Oliff PLC

(57) ABSTRACT

Each ECU transmits a frame to a frame generator. Then, the frame generator decomposes data contained in the received frame and then stores the data into a buffer memory, for each message type. The frame generator generates a message containing data to be transmitted to each ECU, and then transmits the message. Based on the state of a signal indicating the electric power supply status, the frame generator controls the permission or non-permission of transmission processing such that frame transmission is not performed to the ECU to which electric power supply from an electric power supply control device. When any communication part has received an abnormal frame, the frame generator does not include data contained in frames received afterward by the communication part, into a frame generated for other communication parts.

13 Claims, 13 Drawing Sheets

(56) References Cited

U.S. PATENT DOCUMENTS

| | | | |
|---|---|---|---|
| 2006/0164999 A1* | 7/2006 | Yamamoto | H04L 41/06 370/241 |
| 2010/0234968 A1* | 9/2010 | Kurachi | G05B 9/02 700/3 |
| 2010/0281010 A1* | 11/2010 | Yamamoto | H04L 12/40013 707/705 |
| 2011/0214037 A1* | 9/2011 | Okamura | H03M 13/116 714/777 |
| 2011/0307123 A1* | 12/2011 | Abe | G07C 9/00182 701/2 |
| 2012/0060218 A1* | 3/2012 | Kim | H04L 63/1458 726/23 |
| 2012/0147838 A1* | 6/2012 | Qin | H04L 5/001 370/329 |
| 2012/0259998 A1* | 10/2012 | Kaufman | H04L 61/1511 709/245 |

FOREIGN PATENT DOCUMENTS

| | | |
|---|---|---|
| JP | 2002-016614 A | 1/2002 |
| JP | A-2005-159568 | 6/2005 |
| JP | 2006-295345 A | 10/2006 |
| JP | A-2007-038904 | 2/2007 |
| JP | A-2007-281803 | 10/2007 |
| JP | A-2009-027270 | 2/2009 |
| JP | A-2009-212939 | 9/2009 |
| JP | A-2011-142508 | 7/2011 |
| JP | 2012-028851 A | 2/2012 |
| WO | WO 2010/140193 A1 | 12/2010 |

* cited by examiner

FIG. 7

DATA STORED IN BUFFER MEMORY

| DATA TYPE | DATA |
|---|---|
| WHEEL SPEED | WWW [rpm] |
| STEERING ANGLE | XXX [deg] |
| ENGINE REVOLUTION SPEED | YYY [rpm] |
| ⋮ | ⋮ |
| OIL TEMPERATURE | ZZZ [°C] |
| ⋮ | ⋮ |

FIG. 8

DISTRIBUTION CONFIGURATION

| COMMUNICATION DEVICE | CONNECTION | DATA TYPE | GENERATION METHOD | TRANSMISSION PERIOD | EVENT TRANSMISSION |
|---|---|---|---|---|---|
| ECU7a | COMMUNICATION PART 35A | WHEEL SPEED, STEERING ANGLE | — | 1 ms | NECESSITY |
| ECU7b | COMMUNICATION PART 35A | WHEEL SPEED, ENGINE REVOLUTION SPEED | — | 1 ms | NECESSITY |
| ECU7c | COMMUNICATION PART 35B | STEERING ANGLE, ENGINE REVOLUTION SPEED | — | 5 ms | NON-NECESSITY |
| ECU7d | COMMUNICATION PART 35B | STEERING ANGLE, OIL TEMPERATURE | — | 5 ms | NON-NECESSITY |
| ECU7e | COMMUNICATION PART 35C | STEERING WHEEL ANGLE | f (WHEEL SPEED, WHEEL ANGLE) | — | NECESSITY |
| ....... | ....... | ....... | ....... | ....... | ....... |

FIG. 9

TERM CONFIGURATION

| DATA TYPE | TERM OF VALIDITY |
|---|---|
| WHEEL SPEED | 10ms |
| STEERING ANGLE | 15ms |
| ENGINE REVOLUTION SPEED | 5ms |
| ⋮ | ⋮ |
| OIL TEMPERATURE | 100ms |
| ⋮ | ⋮ |

F I G. 1 0

POWER SUPPLY CONTROL
CONFIGURATION

| COMMUNICATION PART | SIGNAL CONDITION |
|---|---|
| COMMUNICATION PART 3 5 A | +B |
| COMMUNICATION PART 3 5 B | +B、I G |
| COMMUNICATION PART 3 5 C | +B、I G |
| ⋮ | ⋮ |

TRANSMISSION MESSAGE GENERATING DEVICE AND VEHICLE-MOUNTED COMMUNICATION SYSTEM

CROSS-REFERENCE TO RELATED APPLICATION

This application is the national phase under 35 U.S.C. §371 of PCT International Application No. PCT/JP2011/077989 which has an International filing date of Dec. 2, 2011 and designated the United States of America.

FIELD

The present invention relates to: a vehicle-mounted communication system in which a plurality of communication devices mounted on a vehicle transmit and receive a message to and from each other; and a transmission message generating device in which communication amount reduction, reliability improvement, and the like are achieved by employing the vehicle-mounted communication system.

BACKGROUND

In the conventional art, a plurality of communication devices such as ECUs (Electronic Control Units) having a communication function are mounted on a vehicle and then mutual message exchange is performed between the plurality of communication devices so that control processing of diverse kind is realized in the vehicle. In the communication in the vehicle, the CAN (Controller Area Network) protocol is employed widely. A communication system of CAN protocol has a network configuration of bus type in which a plurality of communication devices share a communication line. As for the number of communication devices allowed to be connected to one bus, an upper limit is set forth in the CAN protocol and a further limit is placed depending on the communication amount of the bus and the like. In order that communication devices in a number exceeding these limits should be allowed to be mounted, the bus need be divided by using a gateway device.

In Japanese Patent Application Laid-Open No. 2005-159568, a gateway device is proposed in which in communication performed between mutually different intra-vehicle networks through the gateway device, when the transmission timing is delayed owing to a communication error or the like, data is transmitted reliably in descending order of priority. In the gateway device, IDs (IDentifiers) indicating transmission destinations contained in data to be relayed and transmitted are stored in advance. When plural pieces of data are to be transmitted next, the gateway device determines the order of transmission on the basis of the priorities of the IDs.

SUMMARY

In recent years, automobiles such as an electric vehicle and a hybrid vehicle that run by using an electric motor are spreading. In such an automobile, the electric motor is controlled electrically. Thus, in comparison with an automobile that runs by using a gasoline engine of conventional art, it is expected that the amount of messages transmitted and received between the ECUs increases and, at the same time, the period of transmission and reception becomes short. This causes a possibility that the communication amount of the bus of CAN protocol increases so that the number of communication devices allowed to be connected to the bus is reduced.

However, although the communication amount between the ECUs concerning electric motor control increases in comparison with the communication amount between the ECUs concerning gasoline engine control of conventional art, the communication amount between the other ECUs is approximately the same as that of the conventional art. This enhances the difference between the ECUs having a large communication amount and the ECUs having a small communication amount. However, in a case that these ECUs are connected to a common bus, a problem arises that the communication amount of the bus increases owing to the communication amount of the ECUs concerning electric motor control and this causes an increase in the frequency of reception processing of unnecessary messages performed by the other ECUs.

Further, devices such as ECUs mounted on a vehicle operate on the basis of electric power supply from a battery, an alternator, or the like of the vehicle. However, electric power supply from the battery is performed not always to all these devices mounted on the vehicle. For example, depending on the condition whether the gasoline engine of the vehicle is operating electric power supply is performed to necessary ECUs alone. As such, in the vehicle-mounted communication system, a situation that all ECUs connected to the network are operating occurs not always. Thus, when message transmission is performed to ECUs not operating, a problem arises that the unnecessary messages cause an increase in the communication amount.

Further, with the progress of function improvement and multi-functionalization of vehicles, a possibility increases that advanced information is transmitted and received between communication devices in a vehicle-mounted communication system. This causes the necessity of avoiding leakage of such information to the outside. Further, for example, when an unauthorized communication device is connected to the network, a concern arises that an unauthorized message is transmitted from the communication device so as to cause undesired operation in other communication devices. Thus, in a vehicle-mounted communication system to which function improvement and multi-functionalization are to be applied, countermeasures in communication security are desired.

The present invention has been devised in view of such situations. An object thereof is to provide a transmission message generating device and a vehicle-mounted communication system in which unnecessary message transmission and reception between communication devices is allowed to be reduced. Further, another object of the present invention is to provide a transmission message generating device and a vehicle-mounted communication system in which information leakage to the outside, unauthorized entering from the outside, and the like are allowed to be avoided.

The transmission message generating device according to the present invention is characterized by a transmission message generating device mounted on a vehicle and comprising: a plurality of communication parts respectively connected to one or a plurality of communication devices through a communication line and respectively performing transmission and reception of a message containing one or plural pieces of information to and from the connected communication devices; a configuration storage part storing a configuration concerning a type of information to be transmitted, for each of the communication parts or each of the communication devices; message generation part, on a basis of information contained in the message received by the plurality of communication parts, in accordance with the configuration stored in the configuration storage part, generating a message for transmission containing one or plural pieces of information of a type to be transmitted, for each of the communication parts; and control part receiving through a signal line an inputted signal indicating a status of electric power supply from a power supply mounted on the vehicle to the communication devices and then, in accordance with the electric power supply status indicated by the inputted signal, controlling permission or non-permission of transmission by the communication part of the message generated by the message generating part, for each of the communication parts or each of the communication devices, wherein each communication part transmits the message generated by the message generation part to one or a plurality of the communication devices connected through the communication line.

Further, the transmission message generating device according to the present invention is characterized by comprising abnormality judgment part judging abnormality of a message received by the communication part and in that as for information contained in messages received afterward by the communication part having received a message judged as abnormal by the abnormality judgment part, the message generation part does not include the information into the message to other communication parts or alternatively generates a message to which information indicating that abnormality has been concluded in the information is attached.

Further, the transmission message generating device according to the present invention is characterized by comprising: message passing part providing a message received by the plurality of communication parts to a particular communication part and then causing the particular communication part to transmit the message; and abnormality judgment part judging abnormality of the message received by the communication part, and in that as for the communication part having received a message judged as abnormal by the abnormality judgment part, the message passing part does not provide messages received afterward by the communication part, to the particular communication part.

Further, the transmission message generating device according to the present invention is characterized by comprising electric power supply stop control part performing control of causing the communication part to transmit a command of stopping electric power supply to the communication device having transmitted the message judged as abnormal by the abnormality judgment part, to an electric power supply control device controlling electric power supply to the communication devices.

Further, the transmission message generating device according to the present invention is characterized by a transmission message generating device mounted on a vehicle and comprising: a plurality of communication parts respectively connected to one or a plurality of communication devices through a communication line and respectively performing transmission and reception of a message containing one or plural pieces of information to and from the connected communication devices; a configuration storage part storing a configuration concerning a type of information to be transmitted, for each of the communication parts or each of the communication devices; message generation part, on a basis of information contained in the message received by the plurality of communication parts, in accordance with the configuration stored in the configuration storage part, generating a message for transmission containing one or plural pieces of information of a type to be transmitted, for each of the communication parts; and abnormality judgment part judging abnormality of the message received by the communication part, wherein each communication part transmits the message generated by the message generation part to one or a plurality of the communication devices connected through the communication line, and wherein as for the communication part having received a message judged as abnormal by the abnormality judgment part, the message generation part does not include information contained in messages received afterward by the communication part into the message to other communication parts.

Further, the transmission message generating device according to the present invention is characterized by comprising: an information storage part storing information contained in a message received by the communication part; and change judgment part judging presence or absence of a change in the information of the same type having been received in time series by the communication part and then stored in the information storage part, and in that the message generation part generates a message containing the information judged as having a change by the judgment part and then the communication part that should transmit the information transmits the message generated by the message generation part.

Further, the transmission message generating device according to the present invention is characterized by comprising an information storage part storing information contained in a message received by the communication part and in that when a transmission request for information stored in the information storage part is received by the communication part, the message generation part generates a message concerning the communication part having received the transmission request and then the communication part having received the transmission request transmits the message generated by the message generation part.

Further, the transmission message generating device according to the present invention is characterized in that the communication part transmits repeatedly in plural times the message generated by the message generation part.

Further, the transmission message generating device according to the present invention is characterized in that the configuration storage part stores a configuration of a transmission period for the information to be transmitted and that in accordance with the transmission period, the message generation part generates a message for each of the communication parts and then the communication part transmits the generated message.

Further, the transmission message generating device according to the present invention is characterized in that the configuration storage part stores a configuration of a generation method for the information to be transmitted, that information generation part, on the basis one or plural pieces of information contained in the message received by the communication part, generating information in accordance with the generation method stored in the configuration storage part, and that the message generation part generates a message containing the information generated by the information generation part and then the communication part that should transmit the information transmits the message generated by the message generation part.

Further, the transmission message generating device according to the present invention is characterized by comprising: an information storage part storing information contained in a message received by the communication part; and information update judgment part, as for the information stored in the information storage part, judging whether new information of the same type has been stored into the information storage part within a given time, and in that when the information update judgment part judges that new information of the same type has not been stored within the given time, information indicating that the information of the type has not been updated is stored into the information storage part.

Further, the vehicle-mounted communication system according to the present invention is characterized by a vehicle-mounted communication system comprising: a plurality of communication devices mounted on a vehicle; and a transmission message generating device including: a plurality of communication parts respectively connected to one or a plurality of the communication devices through a communication line and respectively performing transmission and reception of a message containing one or plural pieces of information to and from the connected communication devices; a configuration storage part storing a configuration concerning a type of information to be transmitted, for each of the communication parts or each of the communication devices; message generation part, on a basis of information contained in the message received by the plurality of communication parts, in accordance with the configuration stored in the configuration storage part, generating a message for transmission containing one or plural pieces of information of a type to be transmitted, for each of the communication parts; and control part receiving through a signal line an inputted signal indicating a status of electric power supply from a power supply mounted on the vehicle to the communication devices and then, in accordance with the electric power supply status indicated by the inputted signal, controlling permission or non-permission of transmission by the communication part of the message generated by the message generating part, for each of the communication parts or each of the communication devices, wherein each communication part transmits the message generated by the message generation part to one or a plurality of the communication devices connected through the communication line; wherein the communication device transmits a message to the message generating device and then receives a message generated and transmitted by the message generating device.

Further, the vehicle-mounted communication system according to the present invention is characterized by a vehicle-mounted communication system comprising: a plurality of communication devices mounted on a vehicle; and a transmission message generating device including: a plurality of communication parts respectively connected to one or a plurality of the communication devices through a communication line and respectively performing transmission and reception of a message containing one or plural pieces of information to and from the connected communication devices; a configuration storage part storing a configuration concerning a type of information to be transmitted, for each of the communication parts or each of the communication devices; message generation part, on a basis of information contained in the message received by the plurality of communication parts, in accordance with the configuration stored in the configuration storage part, generating a message for transmission containing one or plural pieces of information of a type to be transmitted, for each of the communication parts; and abnormality judgment part judging normality/abnormality of a message received by the communication part, wherein each communication part transmits the message generated by the message generation part to one or a plurality of the communication devices connected through the communication line, and wherein as for information contained in messages received afterward by the communication part having received a message judged as abnormal by the abnormality judgment part, the message generation part does not include the information into the message to other communication parts or alternatively generates a message to which information indicating that abnormality has been concluded in the information is attached; wherein the communication device transmits a message to the message generating device and then receives a message generated and transmitted by the message generating device.

Further, the vehicle-mounted communication system according to the present invention is characterized by a vehicle-mounted communication system comprising: a plurality of communication devices mounted on a vehicle; an electric power supply control device controlling electric power supply to the communication devices; and a transmission message generating device including: a plurality of communication parts respectively connected to one or a plurality of the communication devices through a communication line and respectively performing transmission and reception of a message containing one or plural pieces of information to and from the connected communication devices; a configuration storage part storing a configuration concerning a type of information to be transmitted, for each of the communication parts or each of the communication devices; message generation part, on a basis of information contained in the message received by the plurality of communication parts, in accordance with the configuration stored in the configuration storage part, generating a message for transmission containing one or plural pieces of information of a type to be transmitted, for each of the communication parts; judgment part judging normality/abnormality of a message received by the communication part; and electric power supply stop control part performing control of causing the communication part to transmit to the electric power supply control device a command of stopping electric power supply to the communication device having transmitted the message judged as abnormal by the judgment part, wherein each communication part transmits the message generated by the message generation part to one or a plurality of the communication devices connected through the communication line; wherein the communication device transmits a message to the message generating device and then receives a message generated and transmitted by the message generating device.

In the present invention, a plurality of communication devices mounted on a vehicle are connected to a transmission message generating device. Then, the communication device transmits a message to the transmission message generating device and, a message generated and transmitted by the transmission message generating device is received by the communication device. The transmission message generating device includes a plurality of communication parts connected to a communication line and is allowed to be connected to a plurality of communication lines. Then, each communication line is allowed to be connected to one or a plurality of the communication devices. Here, the message transmitted and received between the communication device and the transmission message generating device contains one or plural pieces of information. For example, in the CAN protocol, the message corresponds to a frame such as a data frame and the information corresponds to one or plural pieces of data stored in a data field of the data frame.

The transmission message generating device stores in advance a configuration of information type to be transmitted, for each communication part or each communication device. The transmission message generating device decomposes the message received from the communication device into one or plural pieces of information and then stores the data into a buffer or the like. Further, the transmission message generating device sorts out the decomposed information in accordance with the stored configuration and then generates a message containing information of the type to be transmitted for each communication part. The generated message is transmitted from each communication part through the communication line to the communication device. By virtue of this, a message containing necessary information is transmitted from the transmission message generating device to the communication device and a message containing unnecessary information is not transmitted.

Further, the transmission message generating device receives signals (e.g., a +B signal, an IG signal, and an ACC signal) indicating the electric power supply status of the vehicle. The transmission message generating device stores in advance which communication device should receive electric power supply in accordance with the states of these signals. The transmission message generating device controls the permission or non-permission of message transmission in accordance with the states of the inputted signals for each communication part or each communication device, such that message transmission is not performed to the communication device not receiving electric power supply. By virtue of this, the transmission message generating device avoids transmission of a non-receivable message to the communication device not receiving electric power supply.

These configurations permit reduction of transmission and reception of unnecessary messages in the vehicle-mounted communication system.

Further, in the present invention, the transmission message generating device judges whether abnormality is included in a message received from a communication device by the communication part. For example, an ID is attached to a message transmitted and received according to the CAN protocol. Then, when the ID of a received message is unregistered, this message may be judged as abnormal. Further, for example, in a case that an error detection code or the like is attached to the message, arithmetic operation may be performed on the basis of this code so that abnormality of the message may be judged.

When an abnormal message is received by any communication part, a possibility is concluded that the communication line connected to the communication part is connected to a communication device in which a trouble such as a fault has occurred, a communication device connected in an unauthorized manner, or the like.

Thus, as for the communication part having received an abnormal message, the transmission message generating device does not include information contained in messages received afterward by the communication part, into a message generated for other communication parts. This permits avoidance of a situation that a message containing abnormal information is transmitted to the communication devices connected to other communication parts.

Alternatively, as for information contained in messages received afterward by the communication part having received an abnormal message, the transmission message generating device generates a message to which information indicating that abnormality has been concluded in the information is attached and then transmits the message to the communication device requiring the information. By virtue of this, the communication device having received the message is allowed to recognize a possibility that abnormal information contained in the message is included.

Further, in the present invention, to a particular communication part of the transmission message generating device, a message received by other communication parts is provided directly without performing decomposition of the received message, sorting of the information, and generation of a transmission message. Then, the message is transmitted to the communication device connected to the particular communication part through the communication line. That is, the transmission message generating device provides in a through manner to the particular communication part the message from other communication parts and then the message is transmitted to the communication device connected to the particular communication part. By virtue of this, for example, the message is allowed to be transmitted rapidly and reliably to the communication devices requiring all information.

Further, the transmission message generating device judges whether abnormality is included in a message received from a communication device by the communication part. As for the communication part having received an abnormal message, the transmission message generating device does not provide information contained in messages received afterward by the communication part, to a particular communication part. This permits avoidance of a situation that a message containing abnormal information is transmitted to the communication device connected to the particular communication part.

Further, in the present invention, the electric power supply control device controls electric power supply from the battery, the alternator, or the like of the vehicle to each communication device. The transmission message generating device provides a command to the electric power supply control device and thereby is allowed to stop (and restore) electric power supply to the communication devices. Then, when an abnormal message is received by any communication part, the transmission message generating device provides to the electric power supply control device a command of stopping electric power supply to the communication device having transmitted the message. By virtue of this, operation of a communication device in which a trouble such as a fault has occurred, a communication device connected in an unauthorized manner, or the like is allowed to be stopped so that transmission of an abnormal message is allowed to be avoided.

Further, in the present invention, the transmission message generating device stores information contained in the message received by each communication part, into a buffer (the information storage part). With respect to information of the same type received in time series by the communication part, the transmission message generating device compares information received at the preceding time with information received at that time so as to judges whether the contents have a change. When the information has a change, the transmission message generating device generates a message containing the information and then provides the message to the communication part to which the information should be transmitted. By virtue of this, when a change arises in the information, the transmission message generating device is allowed to generate a message containing the information and then transmit the message to the communication device requiring the information. Each communication device is allowed to perform processing reliably in accordance with the change in the information.

Further, in the present invention, the transmission message generating device stores information contained in the message received by each communication part, into a buffer (the information storage part). Each communication part is allowed to provide to the message generating device a transmission request for the information stored into the buffer by the transmission message generating device. In the message generating device, when a transmission request is received by any communication part, a message to be transmitted to the communication part is generated and then the message is transmitted to the communication device from the communication part having received the transmission request. By virtue of this, each communication device is allowed to acquire information necessary for itself in a necessary timing.

Further, in the present invention, message transmission performed in a case that a change has arisen in the information and/or message transmission performed in accordance with a transmission request from the communication device are repeated in plural times by the transmission message generating device. By virtue of this, for example, even when message transmission and reception has not been achieved normally owing to a communication failure or the like, since message transmission is repeated, the communication device is allowed to reliably acquire the necessary information.

Further, in the present invention, the transmission message generating device stores in advance a configuration of a transmission period for the information to be transmitted for each communication part or each communication device. The transmission message generating device, with the set-up transmission period, generates and provides a message to the corresponding communication part. Then, the message is transmitted from the communication part to the communication device. By virtue of this, for example, even when no change arises in the information, each communication device is allowed to receive the information reliably with the period set forth in advance and then perform the processing on the basis of the information.

Further, in the present invention, the transmission message generating device stores in advance a configuration of a generation method for the information to be transmitted. The generation method for the information may be stored in advance in the form of an arithmetic expression or a conversion table. The transmission message generating device performs arithmetic processing and the like onto one or plural pieces of information contained in the received message, then generates a message containing the information obtained as the processing result, and then transmits the message to the communication device requiring the information. By virtue of this, for example, in a case that the same arithmetic operation based on the information contained in the received message is to be performed by a plurality of the communication devices, the arithmetic operation is allowed to be performed in advance by the transmission message generating device. This permits reduction of the processing load to the communication device.

Further, in the present invention, the transmission message generating device stores information contained in the message received by each communication part, into a buffer (the information storage part). After that, the transmission message generating device judges whether the information in the buffer has been updated within a given time (that is, a message containing new information of the same type has been received by the communication part and then the information contained in the message has been stored into the buffer). When the information has not been updated within the given time, the transmission message generating device stores information indicating that the information has not been updated. By virtue of this, the transmission message generating device is allowed to transmit a message containing information indicating that the information has not been updated, to the communication device requiring the information not having been updated. The communication device having received the information is allowed to recognize that any abnormality has occurred in the communication device serving as the transmission source of the necessary information.

According to the present invention, a plurality of the communication devices transmit a message to the transmission message generating device. Then, the transmission message generating device suitably recombines plural pieces of information contained in these messages so as to generate a message for transmission in such a manner that necessary information should be transmitted to each communication device. Then, the generated message is transmitted from each communication part to each communication device. By virtue of this, each communication device is allowed to receive a message containing the necessary information and unnecessary message transmission between the communication devices is allowed to be reduced. Further, in accordance with the signals indicating the electric power supply status, the transmission message generating device controls the permission or non-permission of message transmission by each communication part. This avoids that unnecessary message transmission is performed to the communication device not receiving electric power supply. By virtue of these configurations, the communication amount in the vehicle-mounted communication system is allowed to be reduced and occurrence of communication delay and the like is allowed to be suppressed.

Further, according to the present invention, when an abnormal message is received by any communication part, as for the information contained in messages received afterward from the communication part, the transmission message generating device does not transmit a message containing the information to other communication devices or alternatively generates and transmits a message to which information indicating that abnormality has been concluded is attached. By virtue of this configuration, the communication device having transmitted an unauthorized message is allowed to be disconnected from the vehicle-mounted communication system and hence information leakage to the outside, unauthorized entering from the outside, and the like are allowed to be avoided.

The above and further objects and features will more fully be apparent from the following detailed description with accompanying drawings.

BRIEF DESCRIPTION OF THE DRAWINGS

FIG. 7 is a schematic diagram illustrating an example of data stored in a buffer memory.

FIG. 8 is a schematic diagram illustrating an example of a distribution configuration stored in a configuration storage part.

FIG. 9 is a schematic diagram illustrating an example of a term configuration stored in a configuration storage part.

FIG. 10 is a schematic diagram illustrating an example of a power supply control configuration stored in a configuration storage part.

DETAILED DESCRIPTION OF NON-LIMITING EXAMPLE EMBODIMENTS

Figure 1:
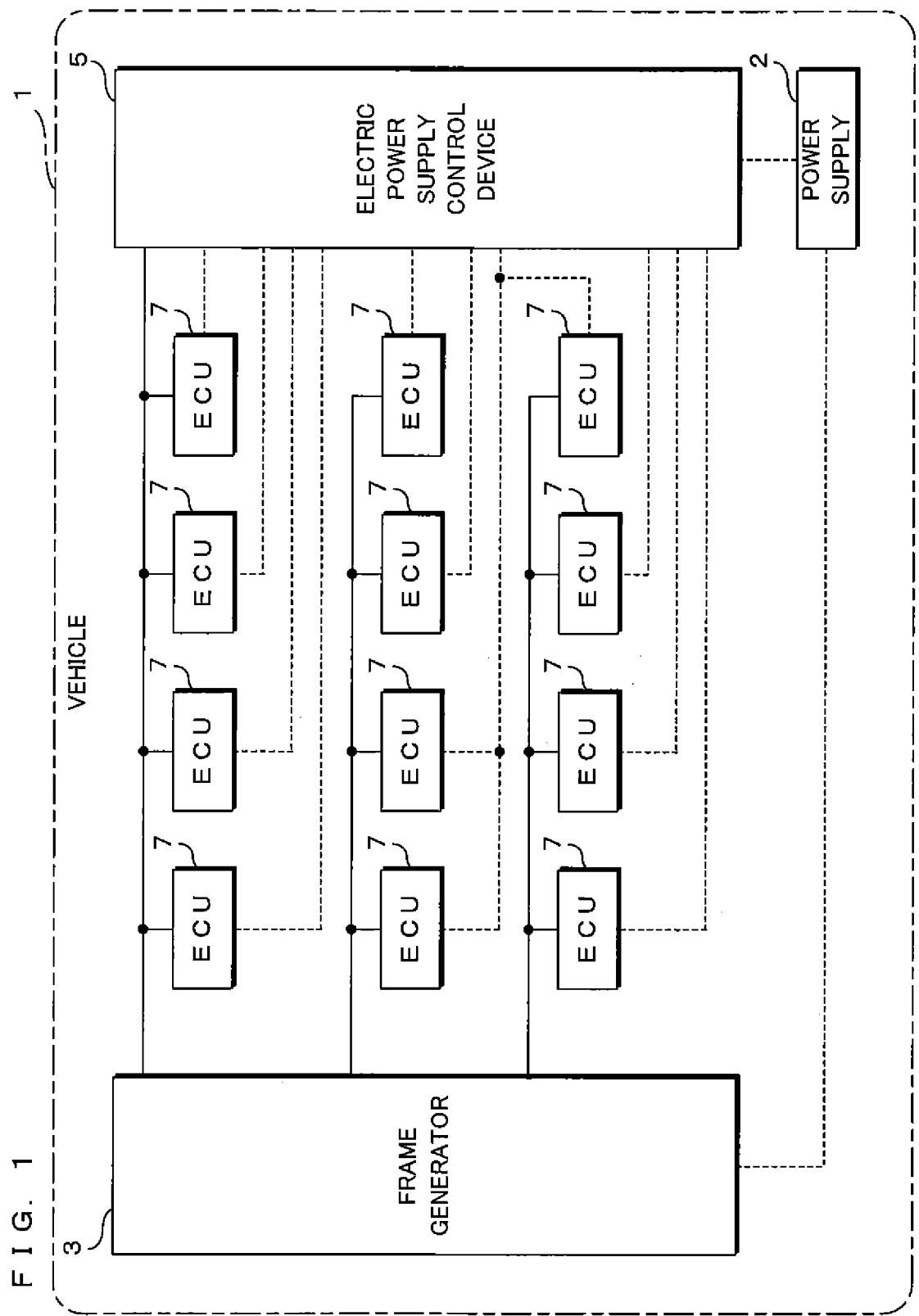
FIG. 1 is a block diagram illustrating a configuration of a vehicle-mounted communication system according to the present embodiment.

The present invention is described below in detail with reference to the drawings describing embodiments. FIG. 1 is a block diagram illustrating the configuration of a vehicle-mounted communication system according to the present embodiment. Here, in FIG. 1, a solid line indicates a communication line and a dashed line indicates a power supply line. In the figure, numeral 1 indicates a vehicle, which is drawn with a dash-dotted line and on which a plurality of ECUs 7 are mounted that perform traveling control of the vehicle 1 and the like. The plurality of ECUs 7 are divided into several (three, in FIG. 1) groups. Each group is connected to a common communication line. The plurality of communication lines are connected to a frame generator 3. Then, communication between mutually different groups is performed via the frame generator 3. Communication between the ECUs 7 within the same group may be performed directly through the common communication line or alternatively may be performed via the frame generator 3.

Further, the vehicle 1 includes a power supply 2 such as a battery and an alternator. Electric power supply from the power supply 2 to each ECU 7 in the vehicle 1 is controlled by the electric power supply control device 5. Further, the frame generator 3 receives electric power supply directly from the power supply 2. The electric power supply control device 5 is connected to each ECU 7 through the power line and allowed to switch supply/shut-down of electric power to each ECU 7. Here, several ECUs 7 may be connected to the electric power supply control device 5 through the common power line. In this case, the electric power supply control device 5 switches supply/shut-down of electric power in a manner that a plurality of the ECUs 7 connected to a common power line are treated as one group. Further, the electric power supply control device 5 is connected to any communication line and allowed to perform communication with the frame generator 3 through the communication line. The frame generator 3 is allowed to provide a command of switching supply/shut-down of the electric power to each ECU 7, to the electric power supply control device 5 through the communication line. Then, in accordance with the command from the frame generator 3, the electric power supply control device 5 performs switchover control of electric power supply.

Figure 2:
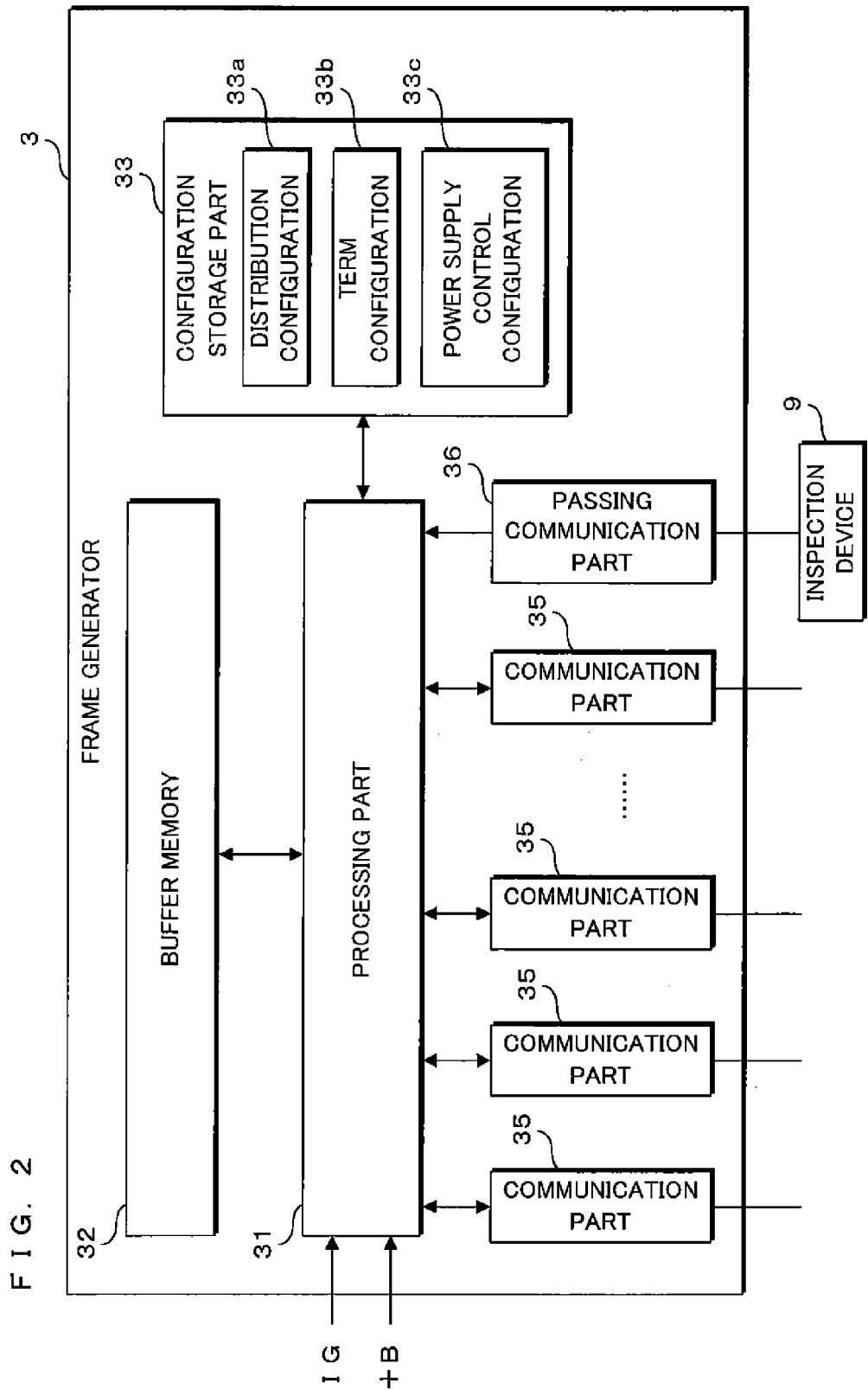
FIG. 2 is a block diagram illustrating a configuration of a frame generator.

FIG. 2 is a block diagram illustrating the configuration of the frame generator 3. The frame generator 3 includes a processing part 31, a buffer memory 32, a configuration storage part 33, a plurality of communication parts 35, and a passing communication part 36. The processing part 31 is constructed from an arithmetic processing unit such as a CPU (Central Processing Unit) and an MPU (Micro Processing Unit) and executes a program stored in advance so as to perform various kinds of processing. Here, the processing part 31 may be constructed from an ASIC (Application Specific Integrated Circuit) or the like. The processing part 31 performs the processing of storing into the buffer memory 32 the data (information) contained in a frame (message) received by the plurality of communication parts 35 and then suitably combining the data stored in the buffer memory 32 so as to generate a frame for transmission.

Further, as signals indicating the electric power supply status in the vehicle 1, the processing part 31 receives two signals consisting of a +B signal and an IG signal. Here, in addition to the +B signal and the IG signal, for example, other signals such as an ACC signal may further be inputted to the processing part 31. The +B signal is a signal to be inputted to vehicle-mounted devices to which electric power from the power supply 2 is always supplied, and hence may be the output voltage of the power supply 2 itself. Thus, the +B signal is at a high level (e.g., 12V) as long as sufficient electric power is stored in the battery of the power supply 2. The IG signal is a signal inputted to vehicle-mounted devices to which electric power is supplied when the gasoline engine of the vehicle 1 is operating, and hence is the output voltage of the power supply 2 provided through an ignition switch (illustration is omitted). Thus, the IG signal is switched between a high level (e.g., 12V) and a low level (0 V) in correspondence to the ON/OFF of the ignition switch. The processing part 31 monitors the +B signal and the IG signal so as to judge the electric power supply status in the vehicle 1 and thereby judges whether communication processing is to be performed on each group of the ECUs 7.

The buffer memory 32 is constructed from a memory device such as an SRAM (Static Random Access Memory) and a DRAM (Dynamic Random Access Memory). The processing part 31 stores data contained in a frame received from the ECU 7 by the communication part 35, into the buffer memory 32. The configuration storage part 33 is constructed from a data-rewritable nonvolatile memory device such as an EEPROM (Electrically Erasable Programmable Read Only Memory) and a flash memory. The configuration storage part 33 stores in advance a plurality of configurations that set forth processing to be performed by the processing part 31. For example, the configuration storage part 33 stores in advance a distribution configuration 33a, a term configuration 33b, and a power supply control configuration 33c. Details of these configurations are described later.

The communication part 35 is connected to one of the communication lines and then performs communication according to the CAN protocol with one or a plurality of the ECUs 7 connected through the communication line. The communication part 35 performs the processing of detecting the signal level of the communication line so as to receive a frame transmitted from the ECU 7. The communication part 35 provides the received frame as digital data to the processing part 31. Further, the communication part 35 performs the processing of performing signal output to the communication line in accordance with the frame for transmission provided from the processing part 31 and thereby transmitting a frame to the ECU 7.

The function, the contents of processing, and the like of the passing communication part 36 are approximately the same as those of other communication parts 35. However, the passing communication part 36 is treated as a special communication part by the processing part 31. The processing part 31 provides all frames received by other communication parts 35, to the passing communication part 36 as a frame for transmission, without recombination of the data and the like. For example, the passing communication part 36 is connected to an inspection device 9 when maintenance or the like of the vehicle 1 is performed. Then, the inspection device 9 acquires data contained in the frames transmitted and received within the vehicle 1 and thereby is allowed to perform various kinds of inspection. Further, for example, a drive recorder may be connected to the passing communication part 36 and then the drive recorder may acquire and record data.

Figure 3:
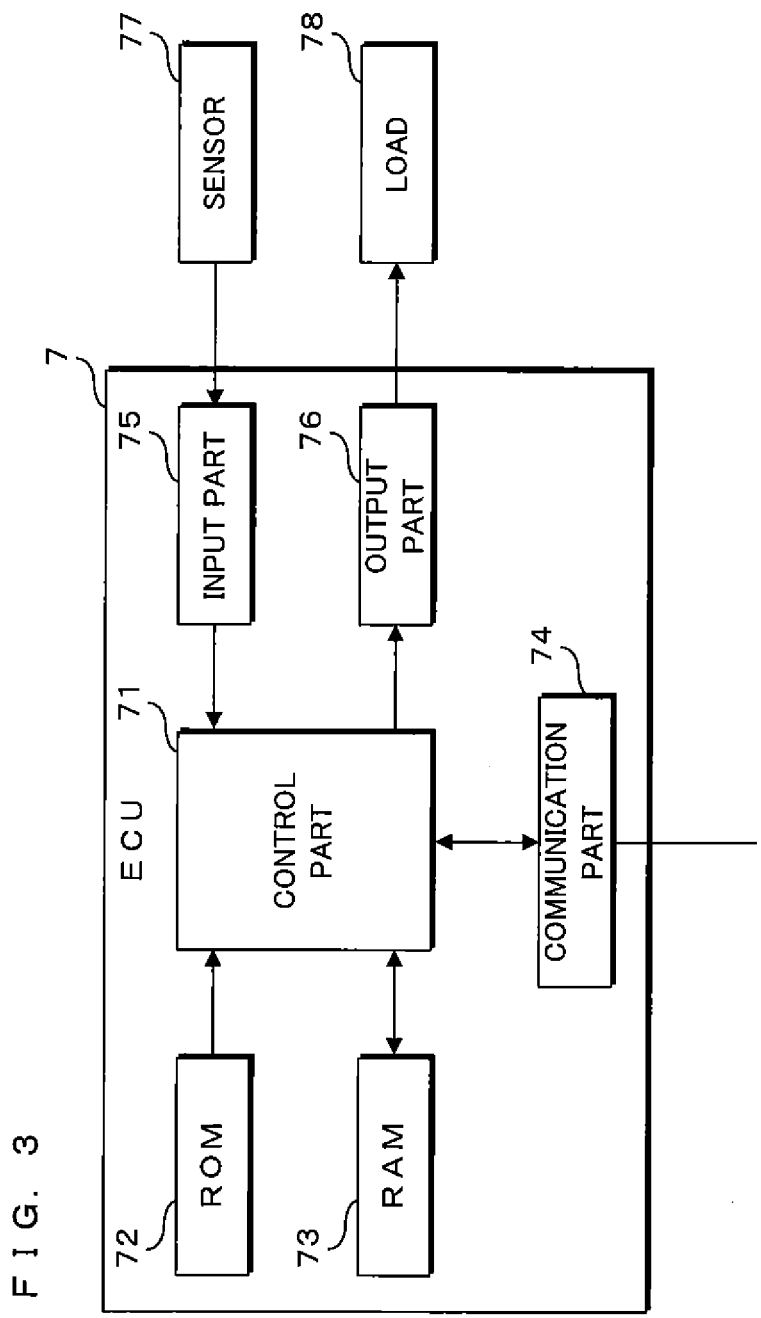
FIG. 3 is a block diagram illustrating a configuration of an ECU.

FIG. 3 is a block diagram illustrating the configuration of the ECU 7. The ECU 7 includes a control part 71, a ROM 72, a RAM 73, a communication part 74, an input part 75, and an output part 76. For example, in the ECU 7, a sensor 77 for detecting a physical quantity of diverse kind such as the wheel speed, the steering angle, the engine revolution speed, and the oil temperature of the vehicle 1 is connected to the input part 75. Then, the ECU 7 performs the processing of transmitting the sensing result of the sensor 77 to other ECUs 7. Further, for example, in the ECU 7, a load 78 such as a running-use electric motor of the vehicle 1 and various kinds of lamps and actuators is connected to the output part 76. Then, on the basis of the sensing result of the sensor 77, the data received from other ECUs 7, and the like, the ECU 7 controls the operation of the load 78. Here, it is sufficient that the ECU 7 includes any one of the input part 75 and the output part 76 and then performs at least one of sensing through the sensor 77 and control of the load 78.

The control part 71 is constructed from an arithmetic processing unit such as a CPU (Central Processing Unit) and an MPU (Micro Processing Unit). The control part 71 read and executes a control program stored in advance in the ROM 72 so as to perform various kinds of control processing. The ROM 72 is constructed from a nonvolatile memory device such as an EEPROM and a flash memory and stores in advance the control program executed by the control part 71 and various kinds of data necessary for execution. The RAM 73 is constructed from a memory device such as an SRAM and a DRAM and temporarily stores data generated in course of arithmetic processing performed by the control part 71, communication data transmitted and received to and from other ECUs 7, and the like.

The communication part 74 has approximately the same configuration as the communication part 35 of the frame generator 3. The communication part 74 is connected to one of the communication lines and then performs communication with the frame generator 3 or other ECUs 7 connected through the communication line according to the CAN protocol. The communication part 74 performs the processing of detecting the signal level of the communication line and thereby receiving a frame transmitted by the frame generator 3 or other ECUs 7. The communication part 74 provides the received frame as digital data to the control part 71. Further, the communication part 74 performs the processing of performing signal output to the communication line in accordance with the frame for transmission provided from the control part 71, and thereby transmitting a frame to the frame generator 3 or other ECUs 7.

The input part 75 is connected to the sensor 77 through a signal line or the like and receives an output signal of the sensor 77. The input part 75 performs sampling of the signals inputted from the sensor 77 and then provides the result as digital data to the control part 71. In accordance with a control command provided from the control part 71, the output part 76 outputs a signal for driving the load 78. On the basis of the sensing result of the sensor 77 provided from the input part 75 and/or the data contained in the frame received by the communication part 74, the control part 71 performs arithmetic processing of calculating the driving amount for the load 78 or the like and then provides a control command to the output part 76 on the basis of the processing result so as to perform control of driving the load 78.

Each of the plurality of ECUs 7 mounted on the vehicle 1 is connected to the sensor 77 or the load 78 of diverse kind and performs sensing processing through the sensor 77 or control processing of the load 78. A plurality of the ECUs 7 perform communication so as to exchange the information and thereby perform individual processing in cooperation with each other, so that various electronic control functions of the vehicle 1 are realized.

Figure 4:
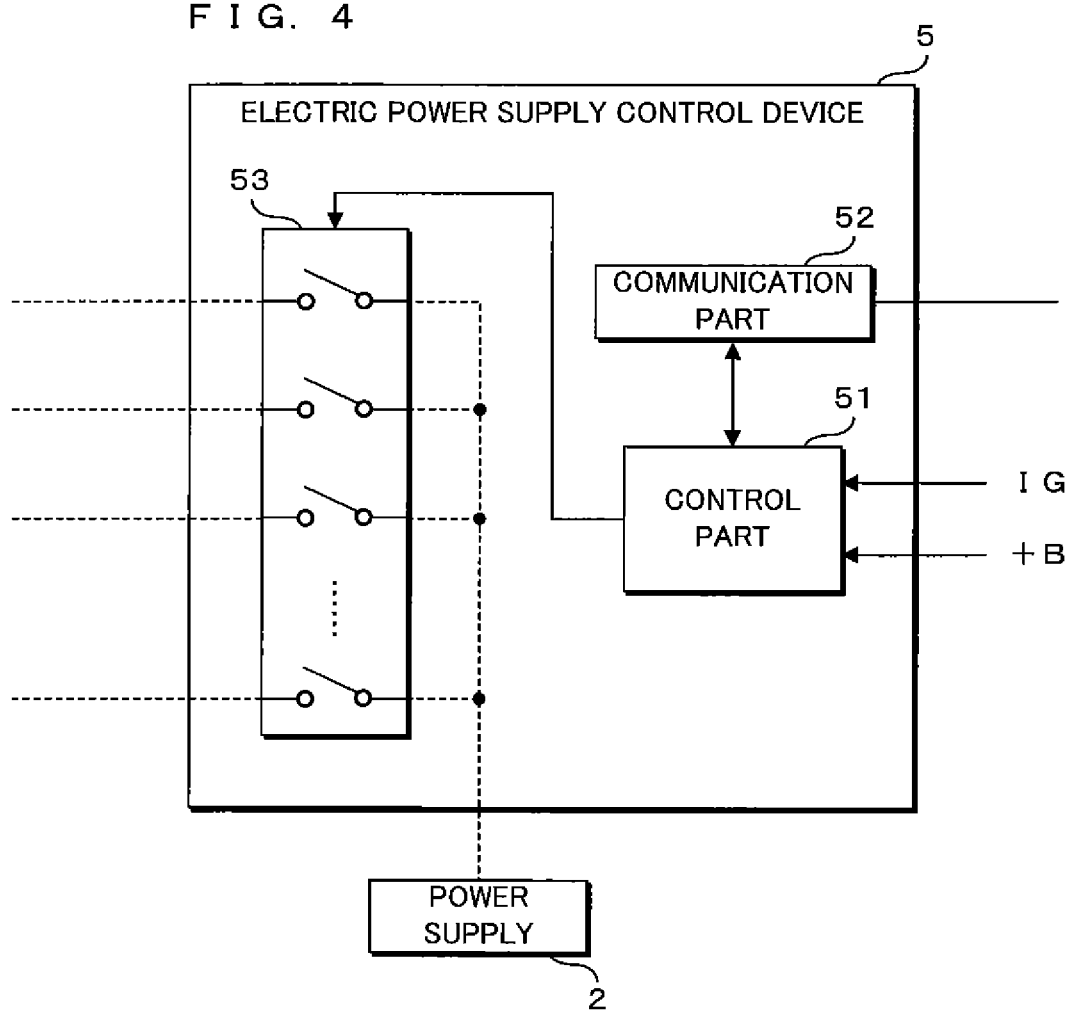
FIG. 4 is a block diagram illustrating a configuration of an electric power supply control device.

FIG. 4 is a block diagram illustrating the configuration of the electric power supply control device 5. The electric power supply control device 5 is implemented as a so-called junction box or the like mounted on the vehicle 1. The electric power supply control device 5 includes a control part 51, a communication part 52, and a switching part 53. The electric power supply control device 5 divides the electric power supplied from the power supply 2 into a plurality of power lines by using a plurality of individually switchable relays provided in the switching part 53, and then supplies the electric power to the various electric devices in the vehicle 1.

For example, the control part 51 is constructed from an ASIC. The control part 51 receives the +B signal and the IG signal indicating the electric power supply status in the vehicle 1 and is allowed to perform communication with the frame generator 3 or the ECUs 7 in the vehicle 1 through the communication part 52. In accordance with the +B signal and the IG signal having been inputted and a command provided from other devices through the communication, the control part 51 performs control of switching the ON/OFF of each relay of the switching part 53.

The communication part 52 has approximately the same configuration as the communication part 35 of the frame generator 3. The communication part 52 is connected to one of the communication lines and then performs communication with the frame generator 3 or the ECUs 7 connected through the communication line according to the CAN protocol. The communication part 52 performs the processing of detecting the signal level of the communication line and thereby receiving a frame transmitted by the frame generator 3 or the ECUs 7. The communication part 52 provides the received frame as digital data to the control part 51. Further, the communication part 52 performs the processing of performing signal output to the communication line in accordance with the frame for transmission provided from the control part 51, and thereby transmitting a frame to the frame generator 3 or the ECUs 7.

In the switching part 53, the plurality of relays are provided. Then, in accordance with the control by the control part 51, these relays are individually turned ON/OFF so as to perform supply/shut-down of the electric power from the power supply 2 to the electric devices in the vehicle 1. In the present embodiment, as illustrated in FIG. 1, each of the power lines branched by the switching part 53 is connected to one or a plurality of the ECUs 7. By virtue of this, the electric power supply control device 5 is allowed to control for each power line the supply/shut-down of the electric power to one or a plurality of the ECUs 7.

Figure 5:
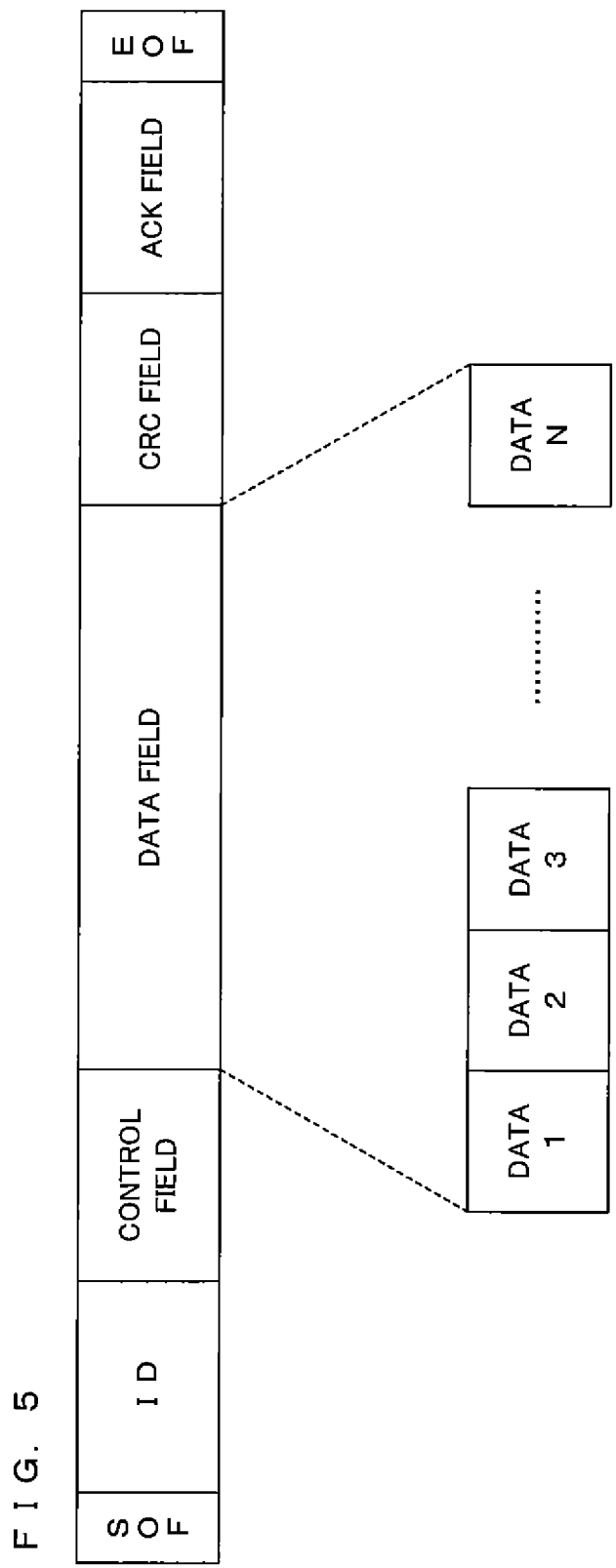
FIG. 5 is a schematic diagram illustrating a configuration of a frame transmitted and received in a vehicle-mounted communication system according to the present embodiment.

FIG. 5 is a schematic diagram illustrating the configuration of the frame transmitted and received in the vehicle-mounted communication system according to the present embodiment. In the vehicle-mounted communication system according to the present embodiment, communication according to the CAN protocol is performed and hence the frame illustrated in the figure corresponds to a data frame of the CAN protocol. The frame of the present embodiment has an SOF (Start Of Frame), an ID (IDentifier), a control field, a data field, a CRC (Cyclic Redundancy Check) field, an ACK (ACKnowledgement) field, and an EOF (End Of Frame).

The SOF indicates the start of the frame. The ID is a number attached in correspondence to the type or the like of the data contained in the frame, and hence used when the processing of communication arbitration is performed. The control field contains information such as the data length necessary for the communication processing. The data field contains information exchanged between the ECUs 7 like the detection value of the sensor 77. The data field is allowed to contain plural pieces of data and may have a fixed length or a variable length. The CRC field is information used for error detection of the frame. The ACK field indicates whether the frame has a correct form (the format is correct and hence absence of an error is concluded in the CRC field). The EOF indicates the end of the frame.

Figure 6:
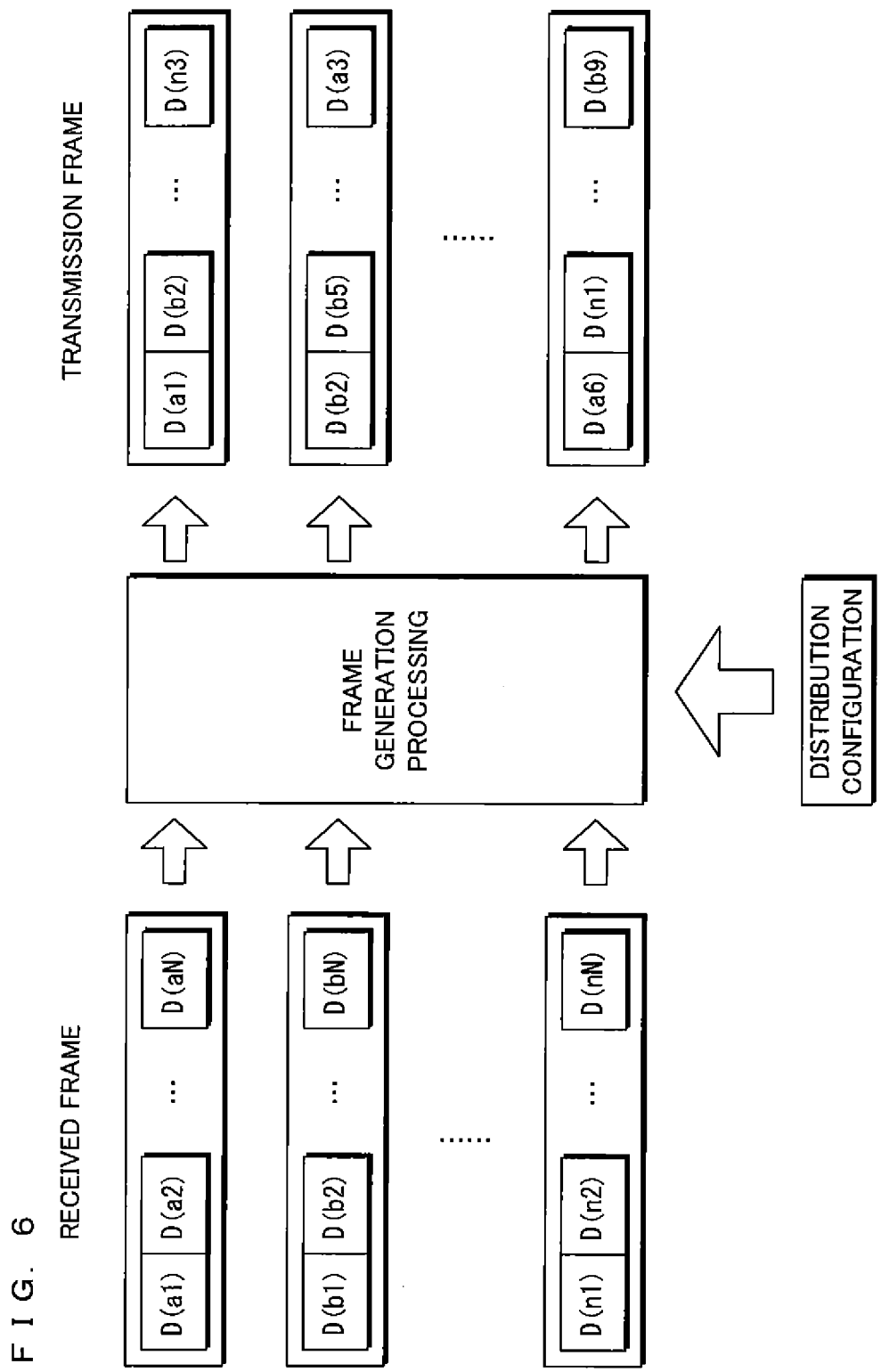
FIG. 6 is a schematic diagram for describing outlines of processing performed by a frame generator.

FIG. 6 is a schematic diagram for describing the outlines of the processing performed by the frame generator 3. Here, in FIG. 6, plural pieces of data contained in the frame transmitted and received between the EUCs 7 are indicated by D(ij). Here, i=a, b, . . . , n. Further, j=1, 2, . . . , N. The frame generator 3 decomposes the data contained in the frame received by each communication part 35 and then primarily stores the data into the buffer memory 32, for each data type. Further, in accordance with the distribution configuration 33a stored in the configuration storage part 33, the frame generator 3 suitably combines the data stored in the buffer memory 32 so as to generate a frame for transmission. The distribution configuration 33a stores the configuration of data type necessary for each ECU 7. That is, the frame generator 3 performs the processing of decomposing and recombining plural pieces of data contained in the received frame so as to generate a frame for transmission containing the data necessary for each ECU 7.

FIG. 7 is a schematic diagram illustrating an example of the data stored in the buffer memory 32. In the buffer memory 32, a region into which data is to be stored is set forth for each data type and then the data contained in the newest received frame is stored. In the example illustrated in the figure, the buffer memory 32 stores data of the types such as the wheel speed, the steering angle, the engine revolution speed, and the oil temperature. Here, the frame generator 3 is allowed to judge the type of the data contained in the received frame on the basis of the ID of the frame and the order of data arrangement in the data field. For example, conditions are set forth in advance like, in a frame of ID=10, the second data in the data field is the steering angle. On the basis of the set-forth conditions, the processing part 31 of the frame generator 3 decomposes the data contained in the frame received by each communication part 35, then judges the type of each data, and then stores each data at the storage position of the buffer memory 32 responding to the data type.

FIG. 8 is a schematic diagram illustrating an example of the distribution configuration 33a stored in the configuration storage part 33. In the distribution configuration 33a, items such as "connection", "data type", "generation method", "transmission period", and "event transmission" are set up for each of the ECUs 7 (distinguished as the ECUs 7a, 7b, . . . , in FIG. 8) that transmits a frame. The "connection" of the distribution configuration 33a indicates which connection part 35 (distinguished as the connection parts 35A, 35B, . . . , in FIG. 8) of the frame generator 3 is connected to the ECU 7. For example, the ECUs 7a and 7b are connected to the communication part 35A, the ECUs 7c and 7d are connected to the communication part 35B, and the ECU 7e is connected to the communication part 35C.

The "data type" of the distribution configuration 33a indicates the type of the data required by the ECU 7. For example, the ECU 7a requires the data of wheel speed and steering angle and the ECU 7b requires the data of wheel speed and engine revolution speed.

Further, in the "generation method", when a type of data is not allowed to directly be acquired from the frame transmitted from the ECU 7, an arithmetic expression or the like used for calculating this data is set up. For example, the ECU 7e requires the data of steering wheel angle. Nevertheless, this data is not allowed to directly be acquired from the frame transmitted from the ECU 7 but is allowed to be calculated from two pieces of data consisting of the wheel speed and the wheel angle in accordance with a function f(wheel speed, wheel angle). Further, for example, the frame generator 3 may compare the magnitude relation between two pieces of data or alternatively the magnitude relation between a threshold and the data, and then may transmit the comparison result as a value of "0" or "1" to the ECU 7. Further, for example, the frame generator 3 may perform arithmetic processing of reducing the number of digits of the significant figure of the data into the precision necessary for the ECU 7 of transmission destination. When the frame generator 3 performs such an arithmetic operation in advance, the arithmetic load to each ECU 7 is allowed to be reduced and the communication amount is allowed to be reduced.

On the basis of the distribution configuration 33a stored in the configuration storage part 33, from the data stored in the buffer memory 32, the processing part 31 of the frame generator 3 reads the data of the type set up by the "data type" and then generates a frame. At that time, when necessary, the processing part 31 generates data that is not allowed to directly be acquired from the received frame, by using the function set up in the "generation method". The processing part 31 provides the generated frame to the communication part 35 connected to the ECU 7 requiring the data contained in the frame, so that the frame is transmitted from the communication part 35 to the ECU 7. The processing part 31 performs the processing of such generation and transmission of a frame, for each of the ECUs 7.

Here, a plurality of the ECUs 7 connected through a common communication line to one of the communication parts 35 are allowed to receive all frames transmitted by the communication part 35. Thus, in place of performing the generation and transmission of a frame for each of the ECUs 7, the frame generator 3 may perform the processing for each of the communication parts 35. That is, the frame generator 3 may include into one frame the data required by the plurality of ECUs 7. Further, in this case, the distribution configuration 33a may store the "data type", "generation method", and the like for each of the communication parts 35 rather than for each of the ECUs 7.

Further, the processing part 31 repeats the above-mentioned processing of generation and transmission of a frame with a period set up in the "transmission period" of the distribution configuration 33a. For example, generation and transmission of a frame to the ECUs 7a and 7b are performed with a period of 1 ms and generation and transmission of a frame to the ECUs 7c and 7d are performed with a period of 5 ms. Further, in addition to periodically performing the generation and transmission of a frame, the processing part 31 is allowed to perform event transmission.

Thus, in the distribution configuration 33a, the necessity or non-necessity of the "event transmission" is set up for each of the ECUs 7a.

The event transmission is a function of performing generation of a frame and transmission to EUC7 when the value of the data stored in the buffer memory 32 has changed. The processing part 31 of the frame generator 3 stores the data contained in the frame received by each communication part 35 into the region of the buffer memory 32 set forth for each data type. The processing part 31 overwrites with the newest data the data stored in the buffer memory 32. At that time, the processing part 31 compares the stored data with the newest overwriting data so as to judge whether the value has changed. Here, the buffer memory 32 may store both of the preceding data and the newest data, and then the processing part 31 may compare the two pieces of data stored in the buffer memory 32. When the data has changed, on the basis of the distribution configuration 33a, the processing part 31 performs generation and transmission of a frame to the ECU 7 requiring the data of this type. For example, when the data of wheel speed has changed, the processing part 31 performs generation and transmission of a frame to the ECUs 7a and 7b and, at the same time, calculates the steering wheel angle and then performs generation and transmission of a frame to the ECU 7e.

Further, when data becomes necessary at a timing other than the timing of the above-mentioned event transmission and periodic transmission, each ECU 7 is allowed to provide to the frame generator 3 a transmission request for the data. When data outputted by other ECUs 7 becomes necessary in the course of processing, the control part 71 of the ECU 7 transmits through the communication part 74 a frame containing a command of transmission request and thereby provides the transmission request to the frame generator 3. When a transmission request from the ECU 7 is received by any communication part 35, on the basis of the distribution configuration 33a, the processing part 31 of the frame generator 3 generates a frame containing the data to be transmitted to the communication part 35 having received the transmission request, and then transmits the generated frame through the communication part 35 having received the transmission request.

Further, when frame transmission is to be performed on the basis of the event transmission or the transmission request described above, the frame generator 3 may transmit the same frame repeatedly in plural times. When such repeated transmission is performed, the number of times of repetition, the transmission period, and the like may be set forth in advance or alternatively set up in the distribution configuration 33a.

In the data stored in the buffer memory 32, a term of validity is set up for each data type and is stored as the term configuration 33b in the configuration storage part 33. FIG. 9 is a schematic diagram illustrating an example of the term configuration 33b stored in the configuration storage part 33. In the term configuration 33b, a term of validity is set up for each data type. For example, the term of validity for the data of wheel speed is 10 ms and the term of validity for the data of steering angle is 15 ms.

For each data type, the processing part 31 of the frame generator 3 stores the data acquired from the received frame into the buffer memory 32 and then judges whether new data has been received within the term of validity set up in the term configuration 33b. When new data has not been received within the term of validity, the processing part 31 discards the data of this data type stored in the buffer memory 32 and, in place of this, stores data indicating that the term of validity has elapsed. The data employed for indicating that the term of validity has elapsed may be a particular negative value set forth in advance, an initial value for the data type, or the like.

After that, when the data whose term of validity has elapsed is to be transmitted to the ECU 7, the processing part 31 generates a frame containing data indicating that the term of validity of this data type has elapsed. The ECU 7 having received the frame recognizes that the necessary data is not allowed to be obtained owing to the elapse of the term of validity, and thereby is allowed to perform error processing or the like.

Further, as described above, in the plurality of ECUs 7 mounted on the vehicle 1, supply/shut-down of electric power is controlled by the electric power supply control device 5 in accordance with the +B signal and the IG signal. The frame generator 3 need not perform generation and transmission of a frame to the ECUs 7 not receiving electric power. Thus, when electric power is not supplied to all ECUs 7 connected to one communication part 35, frame transmission from this communication part 35 is unnecessary. Thus, on the basis of the power supply control configuration 33c stored in the configuration storage part 33, the frame generator 3 determines the permission or non-permission of transmission of a frame from each communication part 35.

FIG. 10 is a schematic diagram illustrating an example of the power supply control configuration 33c stored in the configuration storage part 33. In the power supply control configuration 33c, a condition for transmission of a frame is set up for each of the communication parts 35 (distinguished as the communication parts 35A, 35B, . . . , in FIG. 10) of the frame generator 3. For example, the communication part 35A always transmits a frame when the +B signal is at a high level. Further, for example, the communication parts 35B and 35C transmit a frame when the +B signal and the IG signal are both at a high level.

In accordance with the states of the +B signal and the IG signal have been inputted and the signal condition set up in the power supply control configuration 33c, the processing part 31 of the frame generator 3 judges whether transmission of a frame by each communication part 35 is to be performed. As for a communication part 35 whose transmission of a frame has been concluded as not to be performed, the processing part 31 does not perform generation processing of a frame to be transmitted to the ECU 7 connected to the communication part 35 through the communication line. By virtue of this, the frame generator 3 does not perform generation and transmission of unnecessary frames and hence the processing load is allowed to be reduced.

Here, the frame generator 3 may control the permission or non-permission of frame transmission for each of the communication parts 35 as described above. Alternatively, the control may be performed for each of the ECUs 7. When the permission or non-permission of frame transmission is controlled for each of the ECUs 7, the power supply control configuration 33c stores a signal condition for performing frame transmission for each of the ECUs 7. In accordance with the states of the +B signal and the IG signal having been inputted and the condition of the power supply control configuration 33c, the frame generator 3 determines whether a frame to each ECU 7 is to be generated.

Further, the frame generator 3 has a security function of, when any communication part 35 has received an abnormal frame, disconnecting from the vehicle-mounted communication system the ECU 7 connected to this communication part 35 and thereby avoiding unauthorized entering from the outside, information leakage to the outside, and the like. In the vehicle-mounted communication system according to the present embodiment, the ID to be provided to a frame transmitted and received is set forth in advance. The configuration storage part 33 of the frame generator 3 stores, in advance, information concerning the authorized ID to be provided to the frame. Then, the processing part 31 judges whether the ID provided to the frame received by each communication part 35 is the authorized ID stored in the configuration storage part 33, and thereby judges whether the frame is a normal frame or an abnormal frame.

When any communication part 35 has received an abnormal frame, the processing part 31 discards the frame. Further, as for frames received afterward by the communication part 35, the processing part 31 does not perform transmission by the passing communication part 36 and does not store into the buffer memory 32 the data contained in the frame received by the communication part 35. By virtue of this, the communication line having a possibility of being connected to an unauthorized communication device is allowed to be disconnected from the vehicle-mounted communication system.

Here, in place of disconnecting from the system the communication part 35 having received an abnormal frame, the frame generator 3 may attach an error flag or the like to the data contained in frames received afterward by the communication part 35 and then generate and transmit a frame containing the data with the error flag.

Further, in order to shut down the electric power supply to the ECU 7 connected to the communication part 35 having received an abnormal frame, the processing part 31 transmits an electric power shut-down command to the electric power supply control device 5. The electric power shut-down command contains information identifying the ECU 7 serving as the target of shut-down and is transmitted from one of the communication parts 35 of the frame generator 3 through the communication line to the communication part 52 of the electric power supply control device 5. In the electric power supply control device 5 having received the electric power shut-down command, the control part 51 performs control of turning OFF the relay of the switching part 53 so as to shut down the electric power supply to the ECU 7 specified in the electric power shut-down command.

Figure 11:
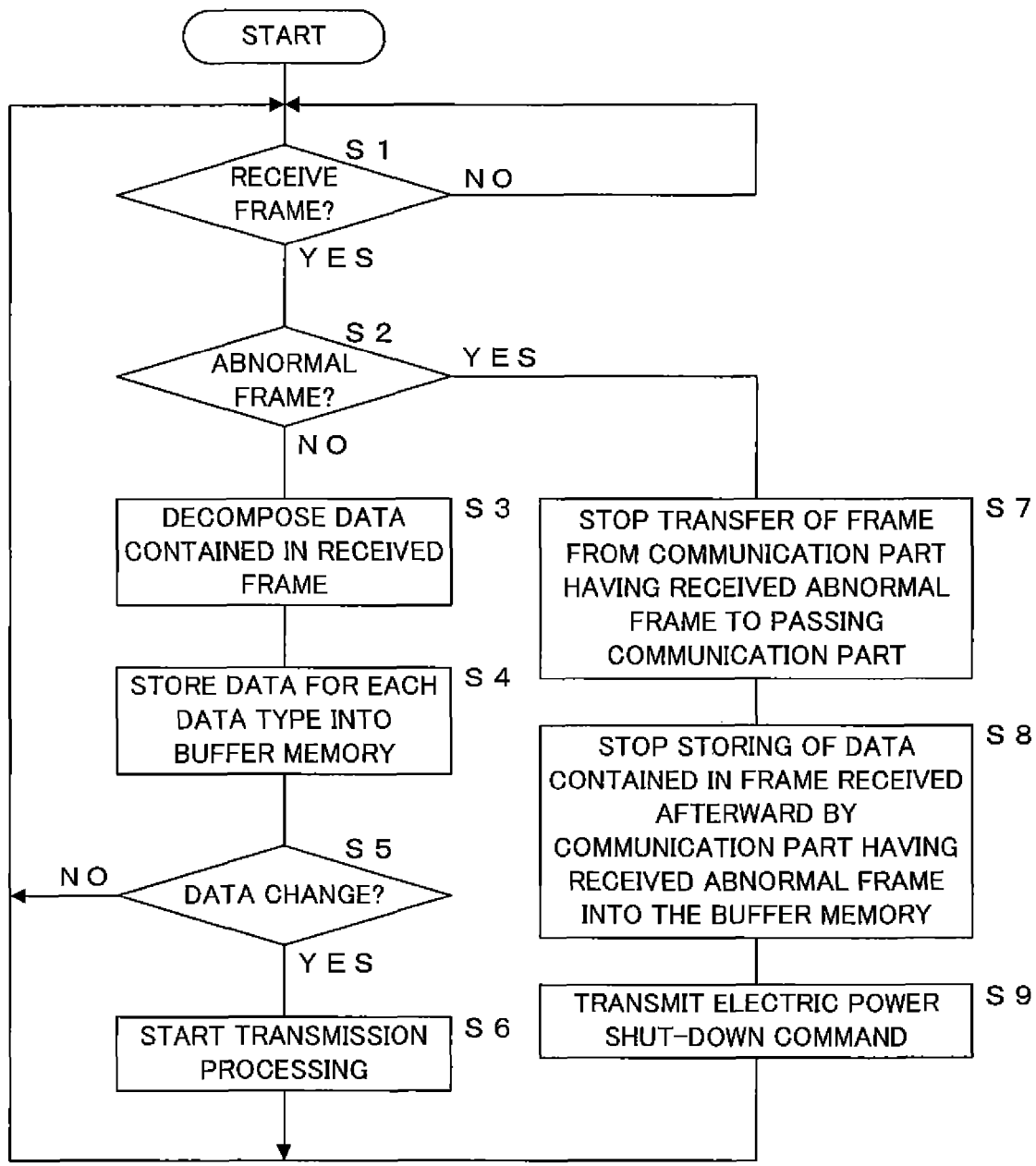
FIG. 11 is a flow chart illustrating a procedure of reception processing performed by a frame generator.

FIG. 11 is a flow chart illustrating the procedure of reception processing performed by the frame generator 3. First, the processing part 31 of the frame generator 3 judges whether any communication part 35 has received a frame from the ECU 7 (step S1). When no frame has been received (S1: NO), the processing part 31 waits until any communication part 35 receives a frame. When a frame has been received (S1: YES), the processing part 31 judges whether the received frame is an abnormal frame (an unregistered ID, an CRC error, or the like) (step S2).

When the received frame is not an abnormal frame (S2: NO), the processing part 31 decomposes the data contained in the received frame (step S3) and then stores the decomposed data for each data type into the buffer memory 32 (step S4). Then, the processing part 31 judges whether the data stored in the buffer memory 32 has changed from the preceding data (step S5). When the data has not changed (S5: NO), the processing part 31 returns the processing to step S1. When the data has changed (S5: YES), the processing part 31 identifies the communication part 35 requiring event transmission in correspondence to this change, then starts transmission processing (step S6), and then returns the processing to step S1.

When the received frame is an abnormal frame (S2: YES), the processing part 31 stops the transfer of frames from the communication part 35 having received the abnormal frame to the passing communication part 36 (step S7). Then, the processing part 31 stops storing, into the buffer memory 32, of the data contained in frames received afterward by the communication part 35 having received the abnormal frame (step S8). Further, in order to stop the electric power supply to the ECU 7 connected to the communication part 35 having received the abnormal frame, the processing part 31 transmits an electric power shut-down command to the electric power supply control device 5 (step S9) and then returns the processing to step S1.

Figure 12:
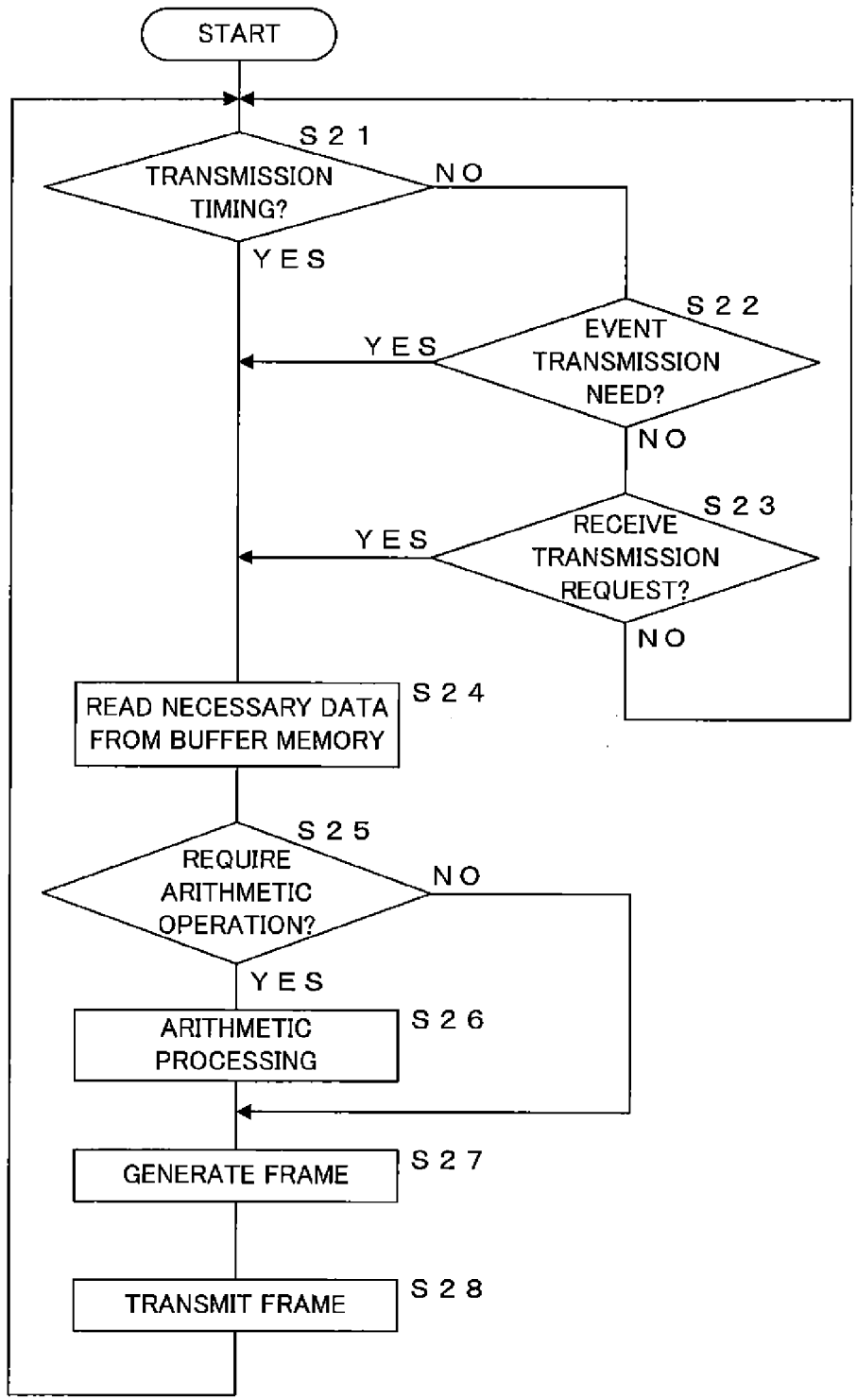
FIG. 12 is a flow chart illustrating a procedure of transmission processing performed by a frame generator.

FIG. 12 is a flow chart illustrating the procedure of transmission processing performed by the frame generator 3. The frame generator 3 performs the transmission processing illustrated in FIG. 12 onto each communication part 35. First, on the basis of the configuration of "transmission period" contained in the distribution configuration 33a, the processing part 31 of the frame generator 3 judges whether the present time is a transmission timing of the communication part 35 serving as the target (step S21). When the present time is not a transmission timing (S21: NO), the processing part 31 judges whether event transmission need be performed in association with a change in the data stored in the buffer memory 32 (step S22). When event transmission need not be performed (S22: NO), the processing part 31 judges whether the communication part 35 has received from the ECU 7 a transmission request for a frame (step S23). When no transmission request has been received (S23: NO), the processing part 31 returns the processing to step S21 and then waits until a periodic transmission timing is reached, until the necessity of event transmission arises, or until a transmission request from the ECU 7 is received.

When a periodic transmission timing has been reached (S21: YES), when the necessity of event transmission has arisen (S22: YES), or when a transmission request from the ECU 7 has been received (S23: YES), in accordance with the configuration of "data type" included in the distribution configuration 33a, the processing part 31 reads the necessary data from the buffer memory 32 (step S24). Then, the processing part 31 judges whether the necessary data requires arithmetic operation (step S25). When arithmetic operation is unnecessary (S25: NO), the processing goes to step S27. When arithmetic operation is necessary (S25: YES), the processing part 31 performs arithmetic processing in accordance with the "generation method" included in the distribution configuration 33a (step S26) and then the processing goes to step S27.

The processing part 31 generates a frame for transmission containing the data read from the buffer memory 32 and/or the data calculated from the read-out data by arithmetic operation (step S27). Then, the processing part 31 provides the generated frame to the corresponding communication part 35 so as to transmit the frame to the ECU 7 requiring the frame (step S28) and then returns the processing to step S21.

Here, as described above, the frame generator 3 performs event transmission and transmission corresponding to a transmission request from the ECU 7 repeatedly in plural times. Thus, the judgment performed at steps S22 and S23 in the flow chart includes also judgment of the necessity or non-necessity of the repeated transmission. Further, in frame transmission for the second time or later, the processing of steps S24 to S27 may be omitted and hence the frame generated at the first time may be reused in transmission.

Figure 13:
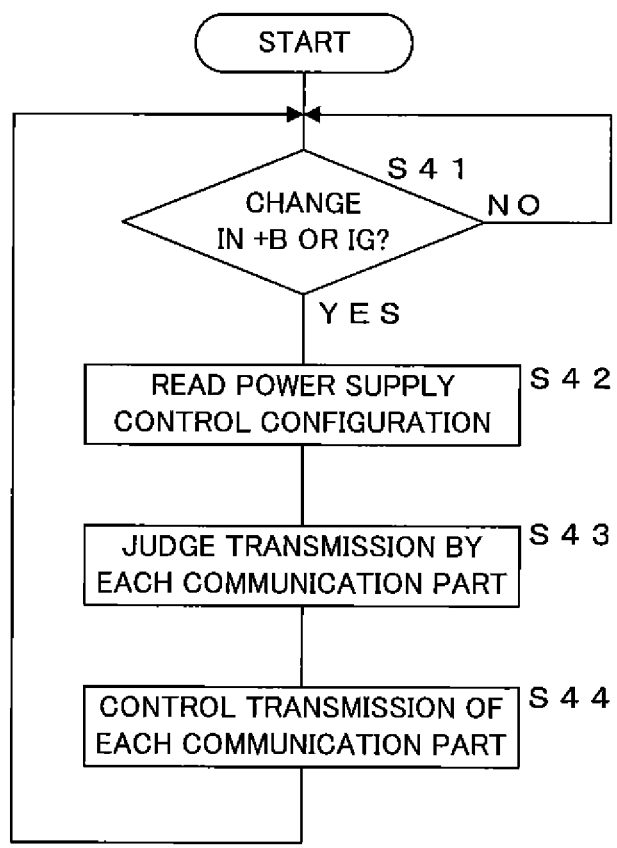
FIG. 13 is a flow chart illustrating a procedure of processing performed by a frame generator in accordance with a signal indicating the electric power supply status.

FIG. 13 is a flow chart illustrating the procedure of processing performed by the frame generator 3 in accordance with a signal indicating the electric power supply status. First, the processing part 31 of the frame generator 3 judges the presence or absence of a change in the +B signal or the IG signal (step S41). In the case of absence of a change in the signal (S41: NO), the processing part 31 waits until a change arises in the signal. In the case of presence of a change in the +B signal or the IG signal (S41: YES), the processing part 31 reads the power supply control configuration 33c from the configuration storage part 31 (step S42) and then, on the basis of the read-out power supply control configuration 33c, judges the permission or non-permission of frame transmission by each communication part 35 (step S43). The processing part 31 controls the permission or non-permission of frame transmission of each communication part 35, for example, by changing the value of an internal flag configuration forth the communication part 35 to be treated as the target of frame generation (step S44), and then returns the processing to step S41. As a result, in the frame generator 3, the communication part 35 whose transmission is permitted performs frame transmission afterward and the communication part 35 whose transmission is not permitted does not perform frame transmission afterward.

In the vehicle-mounted communication system having the above-mentioned configuration, each ECU 7 transmits a frame to the frame generator 3. Then, the frame generator 3 decomposes the data contained in the received frame and then stores the data into the buffer memory 32, for each message type. Further, on the basis of the distribution configuration 33a stored in the configuration storage part 33, the frame generator 3 generates a message containing the data to be transmitted to each communication part 35, and then provides the generated message to each communication part 35 so as to achieve transmission. By virtue of this, in the vehicle-mounted communication system, a frame containing the necessary data is transmitted from the frame generator 3 to each ECU 7 and, transmission and reception of frames containing unnecessary data is allowed to be reduced.

Further, in accordance with the states of the +B signal and the IG signal indicating the electric power supply status of the vehicle 1 and the power supply control configuration 33c stored in the configuration storage part 33, the frame generator 3 controls the permission or non-permission of transmission processing by each communication part 35 such that frame transmission is not performed to the ECU 7 not receiving electric power supply from the electric power supply control device 5. By virtue of this, in the vehicle-mounted communication system, transmission of a non-receivable frame to the ECU 7 not receiving electric power supply is allowed to be avoided and hence transmission and reception of unnecessary frames is allowed to be reduced.

Further, when any communication part 35 has received an abnormal frame, the frame generator 3 does not include the data contained in frames received afterward by the communication part 35, into a frame generated for other communication parts 35. This permits avoidance of a situation that the frame generator 3 transmits a frame containing abnormal data to other communication parts 35. Further, the frame generator 3 directly provides the frame received by each communication part 35 to the passing communication part 36 so as to transmit the frame to the inspection device 9 or the like connected to the passing communication part 36. Here, when any communication part 35 has received an abnormal frame, the frame generator 3 does not provide frames received afterward by the communication part 35 to the passing communication part 36. This permits avoidance of a situation that the frame generator 3 transmits an abnormal frame to the passing communication part 36.

Further, when any communication part 35 has received an abnormal frame, in order to stop the electric power supply to the ECU 7 having transmitted the frame, the frame generator 3 transmits an electric power shut-down command to the electric power supply control device 5. Then, in accordance with the command, the electric power supply control device 5 stops the electric power supply to the ECU 7. By virtue of this, operation of the ECU 7 in which a trouble such as a fault has occurred, a communication device connected in an unauthorized manner, or the like is allowed to be stopped so that transmission of an abnormal frame is allowed to be avoided.

Further, the frame generator 3 stores the data contained in the received frame into the buffer memory 32 in correspondence to the data type. Further, the frame generator 3 compares the data of the same type having been stored in time series and thereby judges whether the contents have a change between the preceding data and the present data. Then, in the case of presence of a change, the frame generator 3 generates a frame containing this data. By virtue of this, when a change arises in the necessary data, each ECU 7 is allowed to reliably acquire the data and thereby achieve the processing.

Further, the frame generator 3 performs generation and transmission of a message with the transmission period for each of the ECUs 7 or each of the communication parts 35 set up in the distribution configuration 33a of the configuration storage part 33. By virtue of this, even in the case of absence of a change in the data stored in time series in the buffer memory 32, each ECU 7 is allowed to reliably receive the frame from the frame generator 3 with the period set forth in advance and thereby achieve the processing based on the data contained in the frame.

Further, the frame generator 3 stores in advance a data generation method into the distribution configuration 33a of the configuration storage part 33, then generates new data on the basis of one or plural pieces of data contained in the received message in accordance with the stored generation method, and then generates and transmits a frame containing the data. This permits reduction of the processing load to the ECU 7 requiring this data.

Further, the frame generator 3 stores in advance a term of validity for data of each data type into the term configuration 33b of the configuration storage part 33. Then, when new data has not been received within the term of validity and hence the data has not been updated, the frame generator 3 stores information indicating that the data has not been updated. By virtue of this, the frame generator 3 is allowed to transmit a frame containing information indicating that the information has not been updated to the ECU 7 requiring the information not having been updated. The ECU 7 having received the information is allowed to recognize that any abnormality has occurred in the ECU 7 serving as the transmission source of the necessary information.

Here, in the present embodiment, the data types, the values of the data, and the like illustrated in FIGS. 7 to 10 are illustrative and not restrictive. Further, the network configuration illustrated in FIG. 1 is illustrative and not restrictive. Further, the frame generator 3 may have a configuration not including the passing communication part 36. Further, the electric power supply control device 5 has a configuration that several ECUs 7 are combined into one group and then supply/shut-down of electric power is switched for each group. However, employable configurations are not limited to this. For example, a configuration may be employed that supply/shut-down of electric power is switched for each of the ECUs 7. Further, the frame generator 3 has a configuration that generation and transmission of a frame is performed when the data has changed. However, even in a case that the data has changed, the data may be concluded as not having changed when the amount of change is small (e.g., smaller than or equal to a threshold).

The embodiment disclosed herein is to be considered in all respects as illustrative and not restrictive. The scope of the invention is defined by the appended claims rather than by the description preceding them, and all changes that fall within metes and bounds of the claims, or equivalence of such metes and bounds thereof are therefore intended to be embraced by the claims.

What is claimed is:

1. A transmission message generating device mounted on a vehicle, the transmission message generating device comprising:
    a plurality of communication sensors respectively connected to one or a plurality of communication devices through a communication line and respectively transmitting and receiving a message containing one or more pieces of information to and from the connected communication devices;
    a memory storing a configuration identifying a type of information to be transmitted, for each of the communication sensors or each of the communication devices;
    a processor programmed to:
        generate a message for transmission containing one or plural pieces of information of a type to be transmitted for each of the communication sensors based on information contained in the message received by the plurality of communication sensors, in accordance with the configuration stored in the memory;
        receive through a signal line an inputted signal indicating a status of electric power supply from a power supply mounted on the vehicle to the communication devices and then, in accordance with the electric power supply status indicated by the inputted signal, controlling permission or non-permission of transmission by the communication sensor of the message generated by the processor, for each of the communication sensors or each of the communication devices;
        judge an abnormality of the message received by the communication sensor; and
        cause the communication sensor to transmit a command of stopping electric power supply to the communication device having transmitted the message judged as abnormal, to an electric power supply control device controlling electric power supply to the communication devices, wherein:
    each communication sensor transmits the message generated by the processor to one or a plurality of the communication devices connected through the communication line, and
    for information contained in messages received afterward by the communication sensor having received the message judged as abnormal by the processor, the processor: (i) does not include the information into the message to other communication sensors, or (ii) generates the message in which information indicating that the processor judges as abnormal is attached to the information.

2. The transmission message generating device according to claim 1, wherein the processor is further programmed to:
    provide the message received by the plurality of communication sensors to a particular communication sensor and then causing the particular communication sensor to transmit the message; and
    judge an abnormality of the message received by the communication sensor, wherein
    for the communication sensor having received the message judged as abnormal by the processor, the processor does not provide messages received afterward by the communication sensor, to the particular communication sensor.

3. The transmission message generating device according to claim 1, comprising:
    a second memory storing information contained in the message received by the communication sensor; wherein
    the processor is further programmed to:
        judge a presence or absence of a change in the information of the same type having been received in time series by the communication sensor and then stored in the second memory, wherein
        the processor generates the message containing the information judged as having a change and then the communication sensor that should transmit the information transmits the message generated by the processor.

4. The transmission message generating device according to claim 3, wherein the communication sensor transmits repeatedly in plural times the message generated by the processor.

5. The transmission message generating device according to claim 1, comprising:
    a second memory storing information contained in the message received by the communication sensor, wherein
    when a transmission request for information stored in the second memory is received by the communication sensor, the processor generates the message concerning the communication sensor having received the transmission request and then the communication sensor having received the transmission request transmits the message generated by the processor.

6. The transmission message generating device according to claim 5, wherein the communication sensor transmits repeatedly in plural times the message generated by the processor.

7. The transmission message generating device according to claim 1, wherein
    the memory stores a configuration of a transmission period for the information to be transmitted, and wherein
    in accordance with the transmission period, the processor, generates the message for each of the communication sensors and then the communication sensor transmits the generated message.

8. The transmission message generating device according to claim 1, wherein
    the memory stores a configuration of a generation method for the information to be transmitted, comprising:
        generating information in accordance with the generation method stored in the memory on the basis one or plural pieces of information contained in the message received by the communication sensor, wherein
        the message is generated containing the information and then the communication sensor that should transmit the information transmits the message generated by the message generation part.

9. The transmission message generating device according to claim 1, comprising:
a second memory storing information contained in the message received by the communication sensor; wherein
the processor is further programmed to:
as for the information stored in the second memory, judge whether new information of the same type has been stored into the second memory within a given time, wherein
when the processor judges that new information of the same type has not been stored within the given time, information indicating that the information of the type has not been updated is stored into the second memory.

10. A transmission message generating device mounted on a vehicle, the transmission message generating device comprising:
a plurality of communication sensors respectively connected to one or a plurality of communication devices through a communication line and respectively performing transmission and reception of the message containing one or plural pieces of information to and from the connected communication devices;
a memory storing a configuration concerning a type of information to be transmitted, for each of the communication sensors or each of the communication devices;
a processor programmed to:
generate the message for transmission containing one or plural pieces of information of a type to be transmitted, for each of the communication sensors on a basis of information contained in the message received by the plurality of communication sensors, in accordance with the configuration stored in the memory;
judge abnormality of the message received by the communication sensor; and
cause the communication sensor to transmit a command of stopping electric power supply to the communication device having transmitted the message judged as abnormal, to an electric power supply control device controlling electric power supply to the communication devices, wherein
each communication sensor transmits the message generated by the processor to one or a plurality of the communication devices connected through the communication line, and wherein
for the communication sensor having received the message judged as abnormal by the processor, the processor does not include information contained in messages received afterward by the communication sensor into the message to other communication.

11. A vehicle-mounted communication system comprising:
a plurality of communication devices mounted on a vehicle; and
a transmission message generating device including:
a plurality of communication sensors respectively connected to one or a plurality of the communication devices through a communication line and respectively performing transmission and reception of a message containing one or plural pieces of information to and from the connected communication devices;
a memory storing a configuration concerning a type of information to be transmitted, for each of the communication sensors or each of the communication devices;
a processor programmed to:
on a basis of information contained in the message received by the plurality of communication sensors, in accordance with the configuration stored in the memory, generate a message for transmission containing one or plural pieces of information of a type to be transmitted, for each of the communication sensors;
receive through a signal line an inputted signal indicating a status of electric power supply from a power supply mounted on the vehicle to the communication devices and then, in accordance with the electric power supply status indicated by the inputted signal, controlling permission or non-permission of transmission by the communication sensor of the message generated by processor, for each of the communication sensors or each of the communication devices; and
judge an abnormality of the message received by the communication sensor; and
cause the communication sensor to transmit a command of stopping electric power supply to the communication device having transmitted the message judged as abnormal, to an electric power supply control device controlling electric power supply to the communication devices, wherein:
each sensor transmits the message generated by the processor to one or a plurality of the communication devices connected through the communication line;
the communication device transmits the message to the message generating device and then receives the message generated and transmitted by the message generating device; and
for information contained in messages received afterward by the communication sensor having received the message judged as abnormal by the processor, the processor: (i) does not include the information into the message to other communication sensors, or (ii) generates the message in which information indicating that the processor judges as abnormal is attached to the information.

12. A vehicle-mounted communication system comprising:
a plurality of communication devices mounted on a vehicle; and
a transmission message generating device including:
a plurality of communication sensors respectively connected to one or a plurality of the communication devices through a communication line and respectively performing transmission and reception of the message containing one or plural pieces of information to and from the connected communication devices;
a memory storing a configuration concerning a type of information to be transmitted, for each of the communication sensors or each of the communication devices;
a processor programmed to:
generate a message for transmission containing one or plural pieces of information of a type to be transmitted for each of the communication sensors on a basis of information contained in the message received by the plurality of communication sensors, in accordance with the configuration stored in the memory,
judge normality/abnormality of the message received by the communication sensor; and
cause the communication sensor to transmit a command of stopping electric power supply to the communication device having transmitted the message judged as abnormal, to an electric power supply control device controlling electric power supply to the communication devices, wherein:

each communication sensor transmits the message generated by the processor to one or a plurality of the communication devices connected through the communication line, for information contained in messages received afterward by the communication sensor having received the message judged as abnormal, the processor does not include the information into the message to other communication sensors or alternatively generates the message in which information judged as abnormal is attached to the information; and the communication device transmits the message to the message generating device and then receives the message generated and transmitted by the message generating device.

13. A vehicle-mounted communication system comprising:

a plurality of communication devices mounted on a vehicle;

an electric power supply control device controlling electric power supply to the communication devices; and a transmission message generating device including:

a plurality of communication sensors respectively connected to one or a plurality of the communication devices through a communication line and respectively performing transmission and reception of a message containing one or plural pieces of information to and from the connected communication devices;

a memory storing a configuration concerning a type of information to be transmitted, for each of the communication sensors or each of the communication devices;

a processor programmed to:

generate a message for transmission containing one or plural pieces of information of a type to be transmitted for each of the communication sensors on a basis of information contained in the message received by the plurality of communication sensors, in accordance with the configuration stored in the memory;

judge normality/abnormality of the message received by the communication sensor; and cause the communication sensor to transmit to the electric power supply control device a command of stopping electric power supply to the communication device having transmitted the message judged as abnormal, wherein each communication sensor transmits the message generated by the processor to one or a plurality of the communication devices connected through the communication line; wherein the communication device transmits the message to the message generating device and then receives the message generated and transmitted by the message generating device.

* * * * *